(12) United States Patent
Jiang et al.

(10) Patent No.: US 9,009,156 B1
(45) Date of Patent: Apr. 14, 2015

(54) SYSTEM FOR AUTOMATIC DATA CLUSTERING UTILIZING BIO-INSPIRED COMPUTING MODELS

(75) Inventors: Qin Jiang, Oak Park, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1018 days.

(21) Appl. No.: 12/590,574

(22) Filed: Nov. 10, 2009

(51) Int. Cl.
*G06F 17/30* (2006.01)

(52) U.S. Cl.
CPC .................................. *G06F 15/175* (2013.01)

(58) Field of Classification Search
USPC .......................................................... 707/737
See application file for complete search history.

(56) References Cited

U.S. PATENT DOCUMENTS

| | | | |
|---|---|---|---|
| 6,449,612 B1* | 9/2002 | Bradley et al. ..................... 1/1 |
| 6,654,743 B1* | 11/2003 | Hogg et al. ........................ 1/1 |
| 6,829,561 B2* | 12/2004 | Keller et al. .................. 702/179 |
| 7,698,335 B1* | 4/2010 | Vronay ......................... 707/737 |
| 7,739,314 B2* | 6/2010 | Datar et al. ................... 707/803 |
| 7,836,108 B1* | 11/2010 | Kupke et al. ................. 707/826 |
| 2002/0161763 A1* | 10/2002 | Ye et al. ........................ 707/7 |
| 2003/0182082 A1* | 9/2003 | Keller et al. .................. 702/179 |
| 2004/0172394 A1* | 9/2004 | Smolsky ......................... 707/6 |
| 2005/0222972 A1* | 10/2005 | Mishra et al. .................... 707/1 |
| 2006/0224529 A1* | 10/2006 | Kermani ........................ 706/13 |
| 2006/0229931 A1* | 10/2006 | Fligler et al. .................. 705/10 |
| 2007/0185824 A1* | 8/2007 | Hitt ............................... 706/25 |
| 2008/0010245 A1* | 1/2008 | Kim et al. ........................ 707/2 |
| 2010/0169262 A1* | 7/2010 | Kenedy et al. ................. 706/50 |
| 2010/0169313 A1* | 7/2010 | Kenedy et al. ................ 707/736 |
| 2011/0060738 A1* | 3/2011 | Gates et al. .................... 707/737 |

OTHER PUBLICATIONS

R. Kozma, et al., "Basic principles of the KIV model and its application to the navigation problem," Journal of Integrative Neuroscience, vol. 2, No. 1, pp. 125-145, 2003.

G.A. Carpenter, et al., "Fuzzy ART: fast stable learning and categorization of analog patterns by an adaptive resonance system," Neural Networks, vol. 4, pp. 759-771, 1991.

R.L. Cannon, et al., "Efficient implementation of the fuzzy c-mean clustering algorrithm," IEEE Transactions on PAMI, vol. 8(2), pp. 248-255, Mar. 1986.

(Continued)

*Primary Examiner* — James Trujillo
*Assistant Examiner* — Kurt Mueller
(74) *Attorney, Agent, or Firm* — Tope-McKay & Associates

(57) ABSTRACT

Described is a system for automatic data clustering which utilizes bio-inspired computing models. The system performs operations of mapping a set of input data into a feature space using a bio-inspired computing model. A number of clusters inside the set of input data is then determined by finding an optimal vigilance parameter using a bio-inspired computing model. Finally, the set of input data is clustered based on the determined number of clusters. The input data is mapped with a Freeman's KIII network, such that each data point is mapped into a KIII network response. Furthermore, the number of clusters is determined using the fuzzy adaptive resonance theory (ART), and the data is clustered using the fuzzy c-means method. Clustering quality measures are used to compute an objective function to evaluate the quality of clustering.

15 Claims, 9 Drawing Sheets

(56) References Cited

OTHER PUBLICATIONS

R. Kozma, et al., "Chaotic resonance—methods and applications for robust classification of noisy and variable patterns," International Journal of Bifurcation and Chaos, vol. 11, No. 6, pp. 1607-1629, 2001.

R. Kozma, et al., "Classification of EEG patterns using nonlinear neurodynamics and identifying chaotic phase transitions," Neurocomputing, vol. 44-46, pp. 1107-1112, 2002.

* cited by examiner

SYSTEM FOR AUTOMATIC DATA CLUSTERING UTILIZING BIO-INSPIRED COMPUTING MODELS

BACKGROUND OF THE INVENTION (1) Field of Invention

The present invention relates to a system for automatic data clustering and, more particularly, to a system for automatic data clustering which utilizes bio-inspired computing models.

(2) Description of Related Art

Data clustering is the assignment of objects into groups, or clusters, such that objects within the same cluster are more similar to one another than objects from different clusters. Several data clustering techniques exist in the art; however, the majority of these techniques require users to specify the number of clusters, which prevents automatic clustering of the data. The ability to automatically cluster large data sets plays an important role in many applications, non-limiting examples of which include image analysis, data mining, biomedical data analysis, and dynamic network analysis.

The primary challenges in the field of data clustering include defining a similarity measure that is optimal for a given application and automatically determining the number of clusters. Researchers have been addressing the challenges of data clustering for many decades. As a result, there are many clustering algorithms reported in the literature. The existing techniques can be grouped into two classes. The first is distribution-based clustering, such as the AutoClass algorithm. The second is distribution-free clustering, such as the K-mean method. In distribution-based clustering, one has to estimate the distributions within the data, and then use the estimated distributions to separate the data. On the other hand, in distribution-free clustering, one uses a minimal distance measure to iteratively separate the data.

Although many techniques have been proposed for data clustering, the key issue of automatically determining the number of clusters inside the data remains unsolved. In many applications, a human operator is involved in determining the number of clusters in the data. Some reported techniques which attempt to estimate the number of clusters automatically have not been entirely successful. Therefore, a robust technique that can estimate the number of clusters automatically has not been presented thus far.

Currently, there are two methods used to estimate the number of clusters in a data set. The first is to incrementally increase the number of clusters, then see which number produces the best result of data clustering. The second is to treat every data point as a cluster initially, then iteratively merge the clusters until the best clustering result is achieved. Both methods depend on the evaluation of the quality of data clustering, which is the most difficult problem. Conceptually, the best clustering result should have minimal averaged distances within a cluster and maximal distances between the clusters. The first requirement prefers a large number of clusters, but the second requirement prefers a small number of clusters. Consequently, there is no best way for determining the number of clusters. One of the reasons for this is that there is not a widely accepted method that can be used to evaluate the quality of data clustering.

Therefore, there is an existing need for a system, method, and computer program product which allows estimation of the number of clusters automatically through the use of bio-inspired computing models.

SUMMARY OF THE INVENTION

The present invention relates to a system for automatic data clustering which utilizes bio-inspired computing models. The system comprises one or more processors that are operable for performing operations of mapping a set of input data into a feature space using a bio-inspired computing model. The system is configured to find an optimal vigilance parameter that yields an optimal quality of clustering of the input data, wherein the quality of clustering is determined by computing a set of clustering quality measures. A number of clusters inside the set of input data is determined based on the optimal vigilance parameter. The set of input data is clustered based on the determined number of clusters, resulting in a set of clustered data. Finally, the set of clustered data is presented.

In another aspect, the set of input data is mapped with a Freeman's KIII network, wherein each data point in the set of input data is mapped into a KIII network response.

In another aspect, the number of clusters inside the set of input data is determined using the fuzzy adaptive resonance theory (ART).

In another aspect, the set of input data is clustered using the fuzzy c-means method.

In yet another aspect, the set of clustering quality measures comprises a similarity measure, a separation measure, and a homogeneity measure, wherein the computed clustering quality measures are used to compute an objective function, wherein the objective function is a function of the vigilance parameter in the fuzzy ART, and wherein the vigilance parameter controls the creation of new clusters.

In another aspect, the system further performs operations of searching for the optimal vigilance parameter that maximizes the objective function by varying the vigilance parameter within a given dynamic range, wherein the optimal vigilance parameter is used to determine the number of clusters.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform said operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
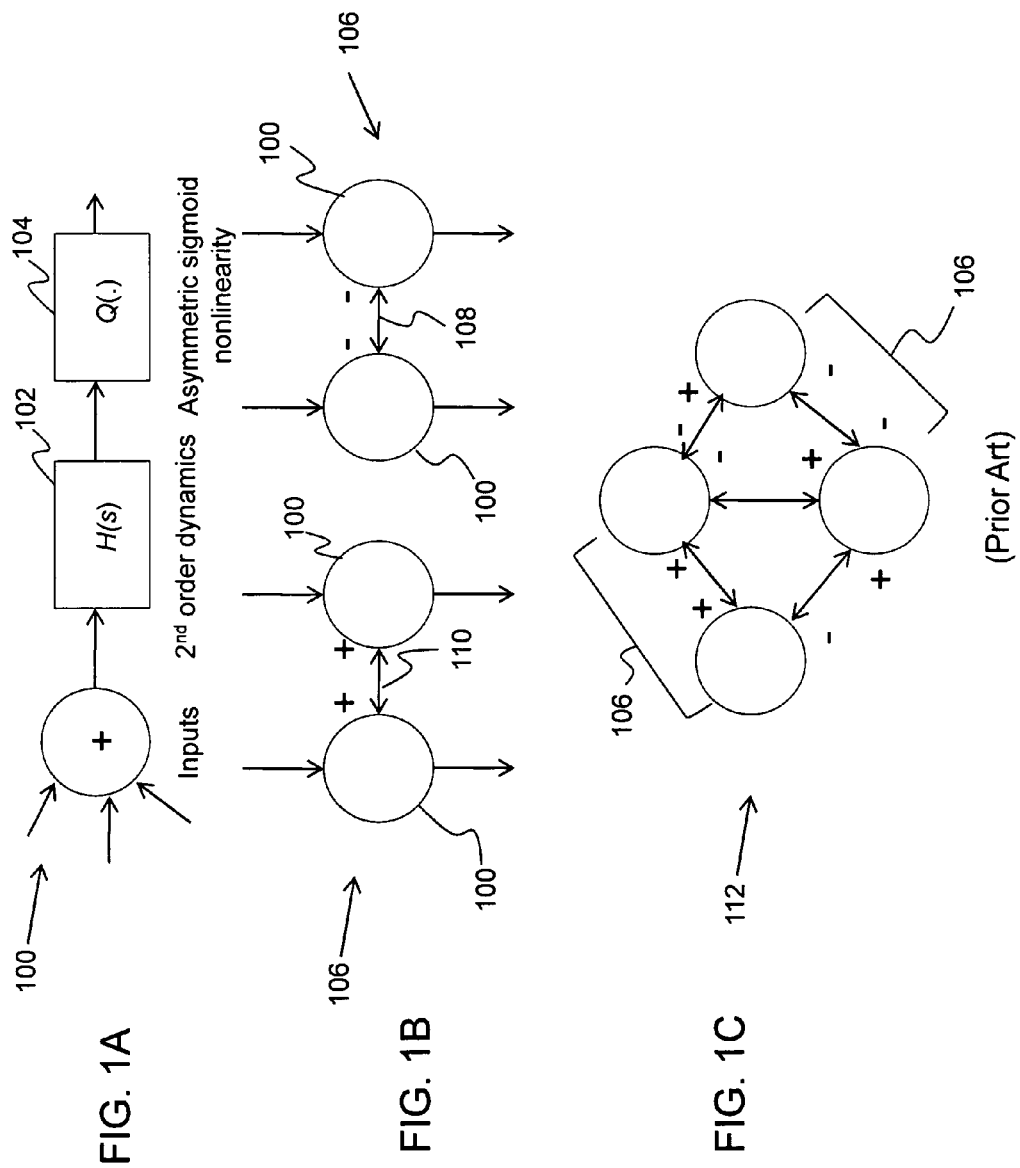
FIG. 1A illustrates Freeman's K0 set model according to prior art.
FIG. 1B illustrates Freeman's KI set model according to prior art.
FIG. 1C illustrates Freeman's KII set model according to prior art.

The present invention relates to a system for automatic data clustering and, more particularly, to a system for automatic data clustering which utilizes bio-inspired computing models. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for automatic data clustering which utilizes bio-inspired computing models. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for automatic data clustering, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

(2.1) Bio-Inspired Computing Models—Freeman's KIII Model

In the present invention, a bio-inspired system to automatically cluster large-scale data sets is described. The invention described herein can be applied to many applications related to high dimensional data analysis, such as data mining, video data analysis (e.g., video surveillance analysis), Diagnostics and Prognostics (D&P), network data analysis, and database indexing. Furthermore, online financial data analysis and sensor network data analysis are additional non-limiting examples of applications of the present invention.

The Freeman's KIII model, as described by Kozma and Freeman in "Basic Principles of the KIV Model and its Application to the Navigation Problem" in the Journal of Integrative Neuroscience, vol. 2, no. 1, pp, 125-145, 2003, is used as a feature-mapping machine to transform input data into a feature space. Then, the adaptive resonance theory (ART) is used to determine the number of clusters inside the data. The ART is described by Carpenter et al. in "Fuzzy ART: Fast Stable Learning and Categorization of Analog Patterns by an Adaptive Resonance System" in Neural Networks, vol. 4, pp. 759-771, 1991, Finally, the fuzzy C-mean algorithm is used to cluster the KIII feature data. The fuzzy C-mean algorithm is described by Cannon et al. in "Efficient Implementation of the Fuzzy C-Mean Clustering Algorithm" in IEEE Transactions on Pattern Analysis and Machine Intelligence (PAMI), vol. 8(2), pp. 248-255, 1986. It should be understood that the references listed above and below are all incorporated by reference as though fully set forth herein.

To understand the advantages of the system described herein, one needs to understand the following bio-inspired computing models: Freeman's KIII model and fuzzy ART. Freeman's KIII model is a mathematical model for a biological system, specifically the olfactory cortex. The model is used to mimic the behavior of olfaction based on neurophysiological recordings and neuroscience concepts. Freeman's model is a hierarchical computing machine consisting of sets K0, KI, KII and KIII. The lowest level is the K0 set 100 depicted in FIG. 1A. The K0 set 100 acts as a basic building block for the other higher level sets and is identified by the second order dynamics. The transformation function H(s) 102 is determined by the following equation:

$$\frac{1}{ab}\ddot{y}(t) + \frac{a+b}{ab}\dot{y}(t) + y(t) = u(t),$$

where a and b are real time constants determined experimentally, u(t) is the forcing input, $\ddot{y}$ represents the second time derivative, $\dot{y}$ represents the first time derivative, and y(t) is the filter output. The output of the linear dynamics is then shaped by the nonlinear function Q(x) 104, which is experimentally determined to be:

$$Q(x) = \begin{cases} q(1 - \exp(-(e^x - 1)/q)) & \text{if } x \geq x_0 \\ -1 & \text{if } x < x_0 \end{cases},$$

where x is the average impulse density of a neuron population, Q(x) is the average wave density resulting from the nonlinear summation inside the neural population, and q represents the parameter determining the saturation level of the sigmoid function Q(x). Additionally, exp and $e^x$ denote the exponential function.

The second level in the hierarchy, KI set 106, is built from K0 sets 100 that interact through lateral inhibitory (−) 108 or excitatory (+) 110 feedbacks. In FIG. 1B, the circles are the K0 sets 100. A KI network can be formed by fully interconnecting KI sets 106.

The KII set 112 consists of two KI sets 106 as shown in FIG. 1C. The KII set 112 is the most interesting and important building block of the model of the olfactory system since it is an oscillator controlled by the input. The response of the KII set 112 to an impulse input is a damped oscillation, whereas with a sustained input, the output oscillation is maintained as long as the input remains.

Figure 2:
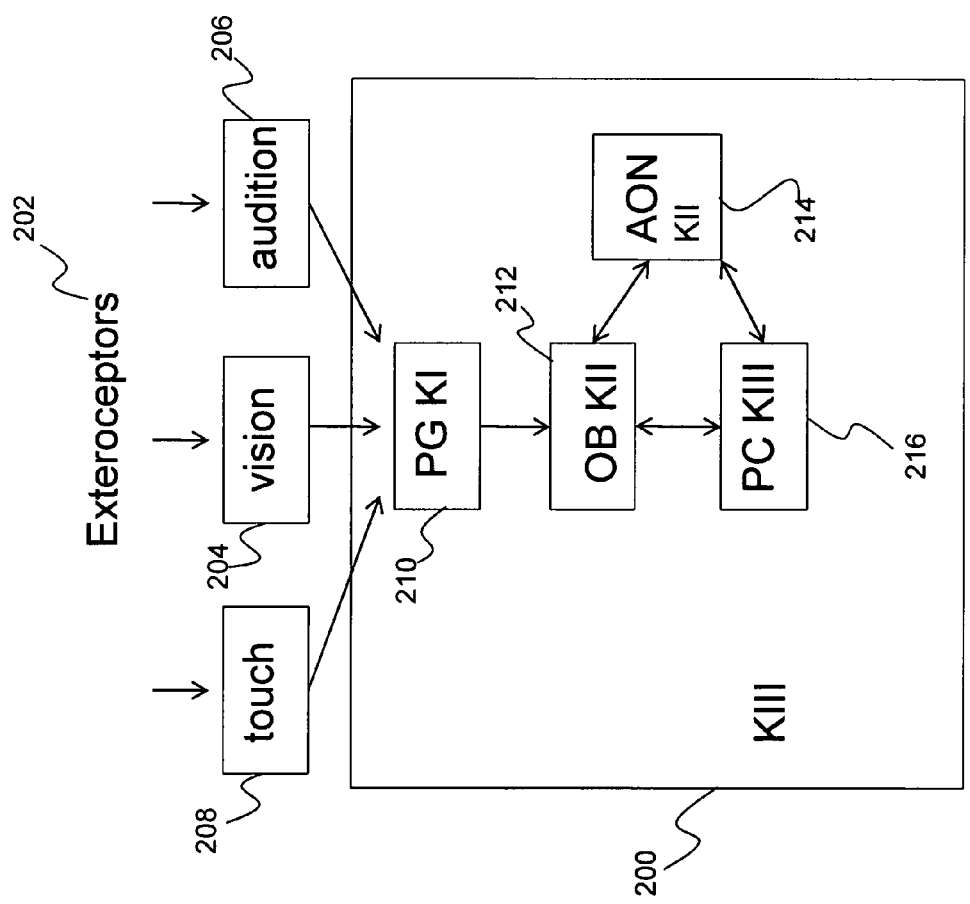
FIG. 2 illustrates Freeman's KIII set model according to prior art.

FIG. 2 illustrates one example in the prior art of Freeman's KIII model. FIG. 2 is a schematic of the cortical KIII model 200 with exteroceptive (sensory nerve end receptors that respond to external stimuli) inputs 202, including vision 204, audition 206, and touch 208. The KIII model was derived from studies in olfactory sensing. The components of the cortical KIII model 200 include the periglomerular (PG) 210, the olfactory bulb (OB) 212, the anterior olfactory nucleus (AON) 214, and the pre-pyriform cortex (PC) 216. The KIII model is a working example of the implementation of the chaotic principles of the human brain. The KIII model 200 exhibits several of the experimentally observed behaviors of the human brain, such as robust pattern recognition, classification of input stimuli, and fast transitions between brains states. The most significant feature of the KIII model 200 is that the KIII network is locally stable but globally unstable, which is also observed in the human brain. PG 210 is a KI set, while OB 212, AON 214, and PC 216 are KII sets.

Compared to other neural network models, Freeman's model has several features that are absent from other models. First of all, Freeman's model is based on neuro-physiological recordings and neuroscience concepts and is biologically more plausible than other models for simulating the capability of information processing in human brain. Secondly, Freeman's model is the only model known thus far which is capable of computation with dynamical systems at the edge of chaos. As described above, the KII set is an oscillator. The KIII set comprises coupled oscillators that exhibit the chaotic behaviors of locally stable and globally unstable, which is believed to play an important role in information processing in the human brain. Finally, Freeman's model provides a hierarchical computing structure, providing more flexibility for constructing more complex networks for complicated applications. Recently, researchers have also used the model to construct computational machines for information processing as presented by Kozma and Freeman in "Chaotic resonance—Methods and Applications for Robust Classification of Noisy and Variable Patterns" in International Journal of Bifurcation and Chaos, vol. 11, no. 6, pp. 1607-1629, 2001 and in "Classification of EEG Patterns Using Nonlinear Neurodynamics and Identifying Chaotic Phase Transitions" in Neurocomputing, vol. 44-46, pp. 1107-1112, 2002.

(2.2) Bio-Inspired Computing Models—Adaptive Resonance Theory

Adaptive Resonance Theory (ART), invented by Stephen Grossberg in 1976, is a type of neural network based explicitly on neurophysiology. An ART network is defined in terms of a set of differential equations intended as plausible models of biological neurons. Originally, the main function of an ART network was to cluster input data, similar to many iterative clustering algorithms in which each input pattern is processed according to the following: finding the nearest cluster seed that resonates with the pattern; updating that cluster seed to be closer to the input pattern; and, if the resonance is less than a certain threshold, then creating a new cluster seed.

There are two crucial features of an ART network. The first is its pattern matching process in searching the nearest cluster seed. The second is that if no cluster seed resonates with the input pattern, a new cluster is created. The pattern matching process involves performing pattern matching between bottom-up input patterns and top-down learned prototype vectors. This matching process leads either to a resonant state that focuses attention and triggers stable prototype learning or to a self-regulating parallel memory search. In other words, if the search ends by selecting an established cluster, then the cluster seed may be refined to incorporate new information in the input patterns. If the search ends by selecting a previously untrained node, then the network creates a new cluster.

Figure 3:
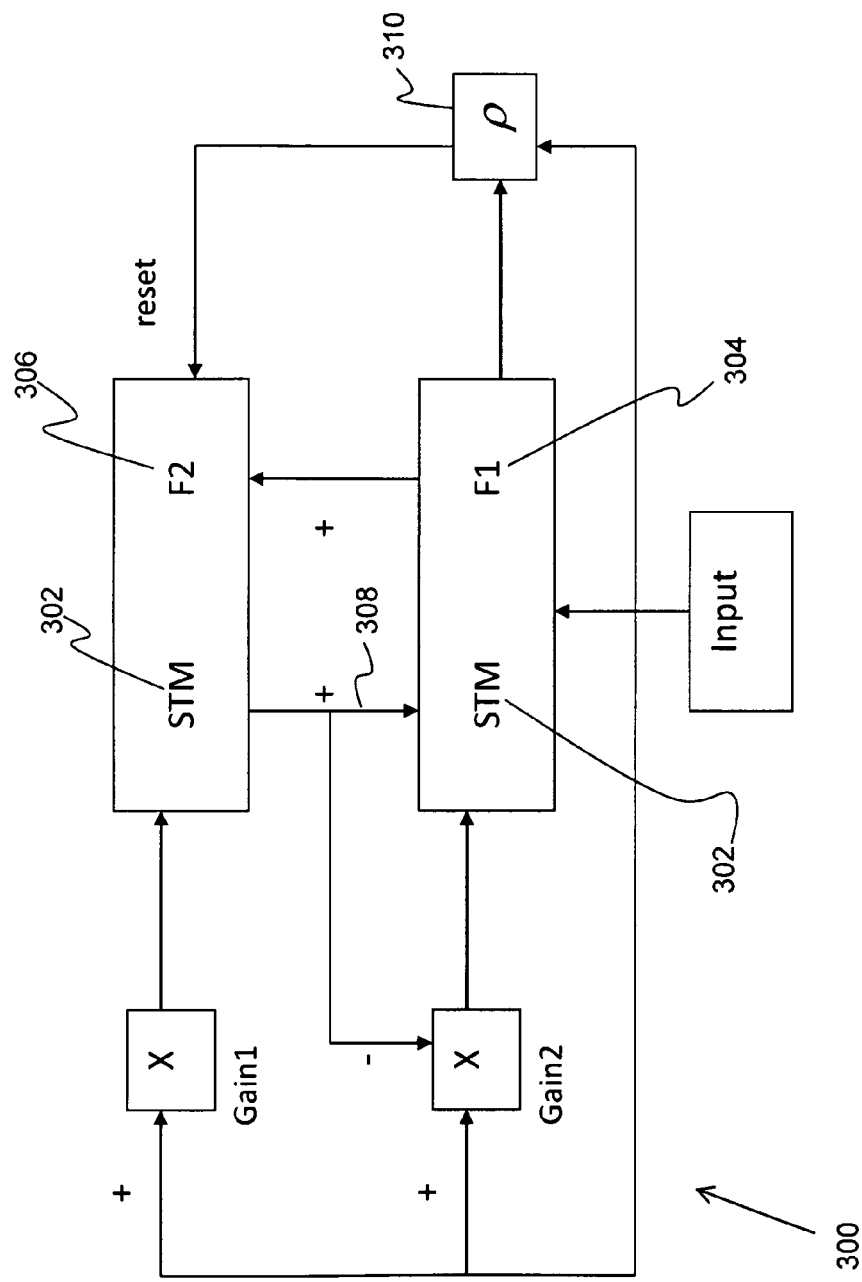
FIG. 3 is a diagram of an Adaptive Resonance Theory (ART) network according to prior art.

FIG. 3 is a diagram of the computing structure of an ART network 300. In the diagram, STM 302 represents short term memory. F1 304 and F2 306 are two internal states, which represent the bottom-up input pattern matching process. The STM to STM path 308 represents the top-down pattern matching process. The parameter $\rho$ 310 is used to control the learning process and the process of creating new clusters. The original ART network, called ART1, deals with only binary data. A fuzzy ART network, with all of the basic features of an ART network, extends the ART1 network to process non-binary data by using fuzzy operators to replace binary operators in the ART1 network.

(3) Specific Details (3.1) Bio-Inspired Automatic Data Clustering

Figure 4:
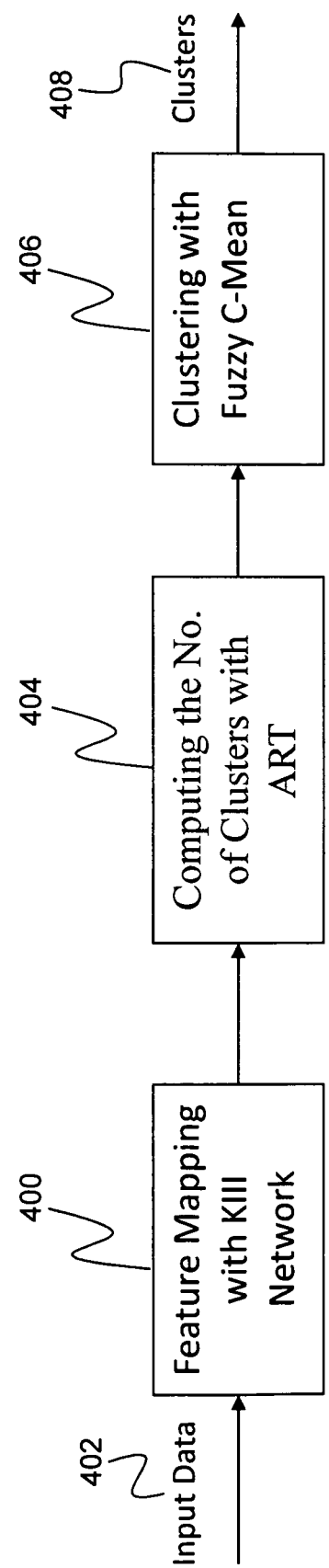
FIG. 4 is a diagram of automatic data clustering according to the present invention.

Since Freeman's KIII network has learning capability for similar input patterns, the network provides the same response to similar input patterns. In the present invention, the response of the KIII network is used as features as illustrated in FIG. 4. In other words, the KIII network is used as a feature-mapping machine 400 that maps every input data point 402 into a KIII network response. Using the KIII network features, fuzzy ART is applied to compute the number of clusters inside the data 404. Fuzzy ART can be used to cluster the data, and it has the capability of determining the number of clusters automatically. The fuzzy C-mean algorithm is one of the most widely used fuzzy clustering algorithms. The fuzzy C-mean algorithm attempts to partition a finite collection of elements into a collection of c fuzzy clusters with respect to some given criterion. In a comparison of fuzzy ART and the fuzzy C-mean method, the latter produced better clustering results if the true number of clusters is known. Therefore, in the present invention, fuzzy ART is used to determine the number of the clusters 404, and then the fuzzy C-mean method is used to do the clustering 406 which results in a plurality of clusters 408 which are presented to at least one end user, which may be a human user or another data processing system. As a non-limiting example, if the present invention is applied to video surveillance data analysis, the output of the clustering is the separation of different objects (e.g., humans, vehicles, buildings) from a video stream.

(3.2) Feature Mapping

To cluster the input data, a clustering technique can work on the original data space. Alternatively, the clustering technique can work on the feature space generated from the data. Generally, the separation of the clusters is better in the feature space than in the original data space, which greatly simplifies the data clustering. To cluster the data in feature space, one needs a feature-mapping/feature-extracting engine to transform the data into the feature space. To achieve better separation of the clusters, the feature space should have the capability to represent different data clusters. In the present invention, Freeman's KIII network is used as the feature-mapping engine due to its learning capability. The KIII network generates the same network response to similar input patterns, which automatically divides input patterns into groups where each group corresponds to similar input patterns. If the network responses are used as features, they will be able to provide better cluster separation than the original data.

Figure 5:
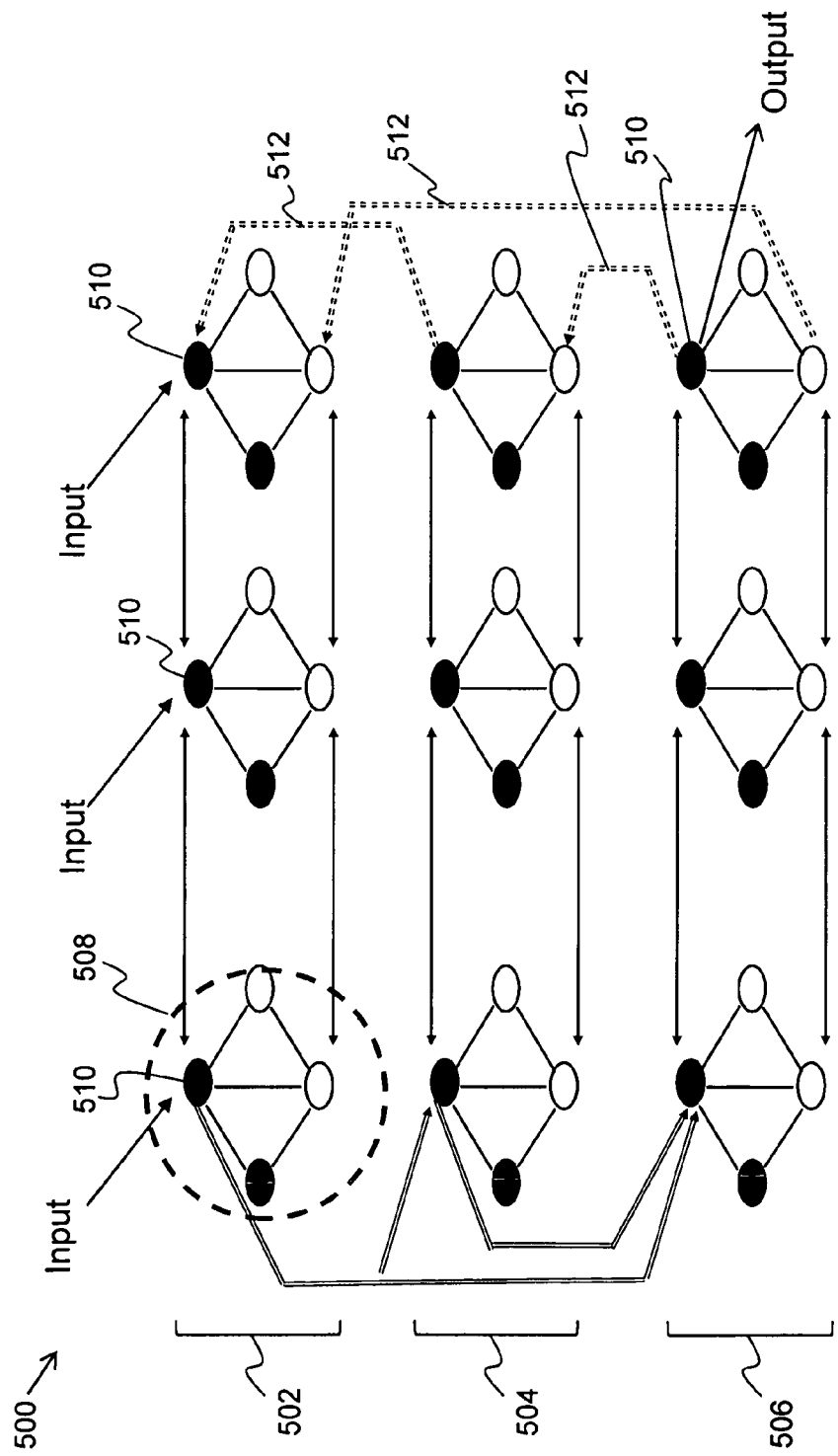
FIG. 5 illustrates a KIII network according to the present invention.

FIG. 5 depicts a diagram of the KIII network 500 used in the present invention. The KIII network 500, which may be considered a generic model of a biological system, consists of three layers 502, 504, and 506 of K2 networks. Each layer 502, 504, and 506 of the KIII network contains three K2 networks 508. The data patterns are inputted into excitatory nodes 510 of the first layer 502, and the network read-out, or output, is taken at excitatory nodes 510 of the third layer 506. The dashed arrows in FIG. 5 represent delayed feedback 512.

(3.3) Computing the Number of Clusters with Fuzzy ART

One of the most challenging problems in data clustering is determining the number of clusters inside the data. In the technique described herein, fuzzy ART is used to determine the number of the clusters. In fuzzy ART, the number of clusters primarily depends on a vigilance parameter, which controls the creation of new clusters. In order to find the best number of clusters, an objective function is defined to measure the quality of the clustering. This quality measure is a function of the vigilance parameter in the fuzzy ART. A search for the best quality of the clustering is performed by varying the vigilance parameter within a given dynamic range.

Figure 6:
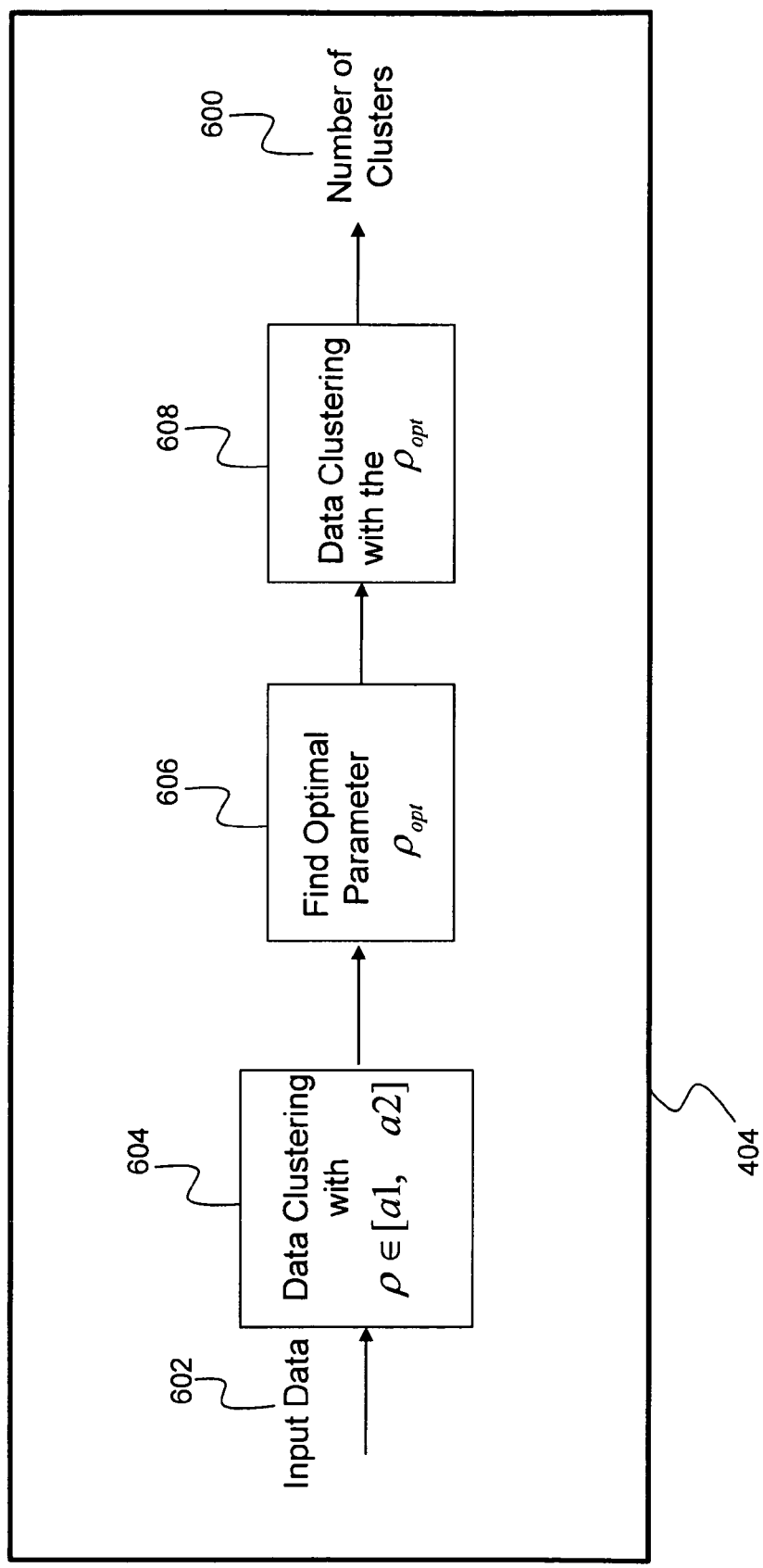
FIG. 6 is a diagram of an approach to determine the number of clusters according to the present invention.

In the present invention, the number of clusters is determined by finding the optimal vigilance parameter that yields the best quality of the clustering. FIG. 6 depicts the approach described herein for determining the number of clusters 600. The act of computing the number of clusters 404, as first described in FIG. 4, is expanded upon in FIG. 6. Input data 602 is first clustered into data clusters having a given dynamic range for the vigilance parameter $\rho$ 604. A search for the optimal value that maximizes a cost function J is performed by varying the vigilance parameter within a given dynamic range in order to find an optimal vigilance parameter $\rho_{opt}$ 606, where $$\rho_{opt} = \underset{\rho}{\operatorname{argmax}}\{J(\Delta Sep, \Delta Hom)\}$$

and arg max represents the argument of the maximum. The steps involved in finding the optimal vigilance parameter $\rho_{opt}$ are described in detail below. The data is then clustered with the optimal vigilance parameter $\rho_{opt}$ 608.

Figure 7:
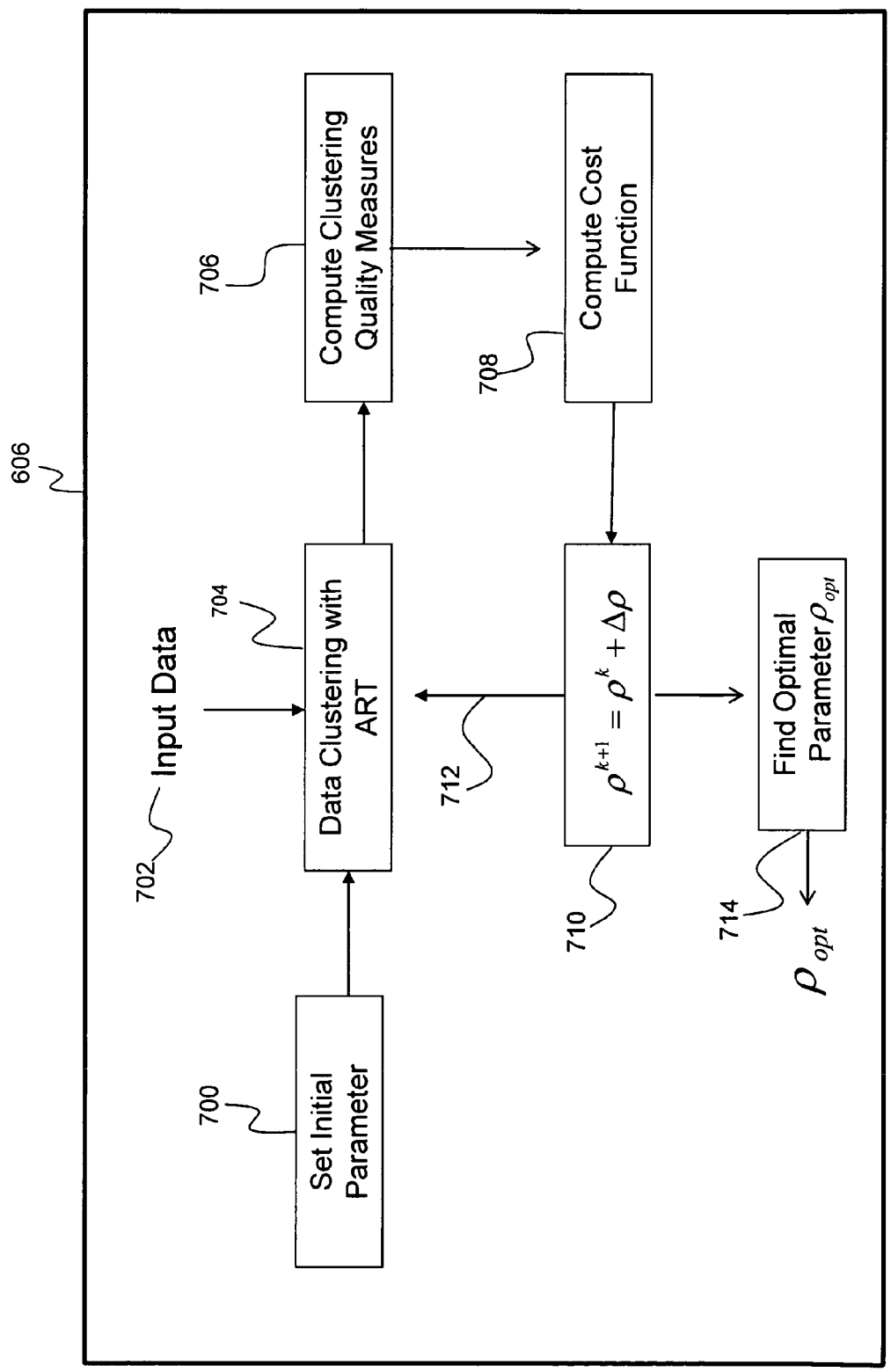
FIG. 7 is a diagram of an approach to finding an optimal parameter according to the present invention.

The method for finding the optimal value of the vigilance parameter 606, as first described in FIG. 6, is expanded upon in FIG. 7. An initial vigilance parameter is first set 700, and input data 702 is clustered with ART 704. Clustering quality measures (e.g., similarity, homogeneity, and separation measures) are then computed 706, which will be described in more detail below. From the computed clustering quality measures 706, the cost function J is computed 708 as described above. For a given range of the vigilance parameter 710, a search for an optimal value that maximizes the cost function J is performed. The dynamic range of $\rho$ is [0.0, 1.0]. Additionally, $\Delta\rho$ is pre-determined from a range of [0.01, 0.05]. If $\Delta\rho$ is too large, the iteration may not be able to find the optimal value. If $\Delta\rho$ is too small, the iteration will take longer to find the optimal value. The process is repeated 712 until the optimal vigilance parameter $\rho_{opt}$ is found 714 (maximal increase in the homogeneity and minimal decrease in the cluster separation).

To compute the quality of the clustering 706, a similarity measure between two vectors is defined using a fuzzy operator, since fuzzy ART uses fuzzy operators in its computation. For two data vectors, $X=[x_1, x_2, \ldots, x_N]^T$ and $Y=[y_1, y_2, \ldots, y_N]^T$ the similarity measure of the two vectors is given as:

$$Sim(X, Y) = \frac{1}{2}\left[\frac{|X \wedge Y|}{|X|} + \frac{|X \wedge Y|}{|Y|}\right],$$

where T denotes transpose and $\|$ denotes absolute value. The fuzzy operator $\wedge$ is defined as follows: $Z=X \wedge Y$, where $Z=[z_1, z_2, \ldots, z_N]^T$ and $z_i=\min(x_i, y_i)$, $i=1, 2, 3, \ldots, N$. The norm for the similarity measure is given by $$|X| = \sum_i |x_i|,$$

where $\Sigma$ represents a summation. With this similarity measure, if $X=Y$, $Sim(X, Y)=1.0$ and $Sim(X, Y)=Sim(Y, X)$. Sim is a scalar to measure the similarity of two vectors. Furthermore, the similarity measure is symmetric and non-negative.

Based on the similarity measure, two other measures are defined to evaluate the separation among the clusters and the homogeneity within a cluster. For a given number of K cluster centers, $\{W_1, W_2, \ldots, W_K\}$, the separation among the clusters is given as:

$$Sep = \sum_i p_i * D_i,$$

with $$D_i = (1.0 - Sim(W_i, CW)),$$

and $$p_i = \frac{N_i}{N},$$

and $$CW = \frac{1}{K}\sum_{i=1}^{K} W_i,$$

where $N_i$ is the number of data points in the cluster i, and the total number of data points in all clusters is N. CW is a vector representing the center of all clusters.

The averaged homogeneity (Hom) of the clustering is defined as:

$$\text{Hom} = \sum_i p_i * \text{Hom}_i,$$

with $$\text{Hom}_i = \frac{1}{N_i} \sum_k \text{Sim}(X_k, W_i).$$

$$\text{Hom}_i = \frac{1}{N_i} \sum_k \text{Sim}(X_k, W_i)$$

defines the homogeneity within a cluster. Ideally, the best clustering should have the maximal averaged homogeneity and the maximal cluster separation. However, these two measures have different behaviors. As the number of clusters increases, the averaged homogeneity increases, while the cluster separation decreases. Thus, the maximal value of the cost function J will have the maximal increase in the homogeneity and the minimal decrease in the separation.

Using the homogeneity and separation measures described above, the cost function J is defined to measure the quality of the clustering. For iterative computing, at iteration k, the cost function J is given by:

$$J(\rho) = \frac{\Delta \text{Hom}}{\Delta \text{Sep}},$$

where $$\Delta Hom = Hom^k - Hom^{k-1}$$

and $$\Delta Sep = Sep^k - Sep^{k-1}.$$

The symbols $Hom^k$ and $Sep^k$ are the homogeneity and separation measures computed at the iteration k. As described above, the cost function J is computed 708 from the computed homogeneity and separation measures. The cost function J is defined by the changes of the homogeneity and separation measures in each iteration, and not the values of the two variables.

As depicted in FIG. 7, the computed clustering quality measures 706 indirectly depend on the vigilance parameter ρ 710. For instance, the data is iteratively clustered and the clustering quality measures are computed 706. In each iteration, the vigilance parameter ρ 710 is incrementally increased until it reaches a predetermined upper bound. Therefore, for every given value of the vigilance parameter ρ 710, a result from clustering with ART is obtained 704, and the clustering quality measures are calculated 706 to evaluate the quality of clustering. In other words, after finding a new vigilance parameter 710 $\rho^{k+1}$ in the search for an optimal vigilance parameter, the data is clustered again based on the new vigilance parameter. The quality of the clustering with the new vigilance parameter is then assessed by computing the clustering quality measures 706. For a given range of the vigilance parameter 710, a search for an optimal value that maximizes the cost function is performed as described above. The process is repeated 712 until the optimal vigilance parameter $\rho_{opt}$ is found 714 (i.e., maximal increase in the homogeneity and minimal decrease in the cluster separation).

(3.4) Clustering with Fuzzy C-Mean

After computing the number of clusters inside the data, the fuzzy C-mean is used to cluster the data as described by Cannon et al. in "Efficient implementation of the fuzzy c-mean clustering algorithm," in *IEEE Transactions on PAMI*, vol. 8(2), pp. 248-255, March 1986. In an experimental test, it was discovered that the clustering results from fuzzy C-mean are more robust and accurate than the results from fuzzy ART clustering. However, the fuzzy C-mean requires the number of clusters as an input parameter, which means it is not capable of determining the number of clusters alone. Basically, the fuzzy C-mean algorithm constructs a set of membership functions that map the data space into the range of [0.0, 1.0]. For a given m clusters on data space X, membership function $u_j$: X−>[0.0, 1.0], j=1, 2, . . . , m. The number of clusters is equal to the number of membership functions, and each data point in the data space has a membership value associated with each cluster. The maximal membership value is used to determine the class identification (ID) for the data point.

Figure 8:
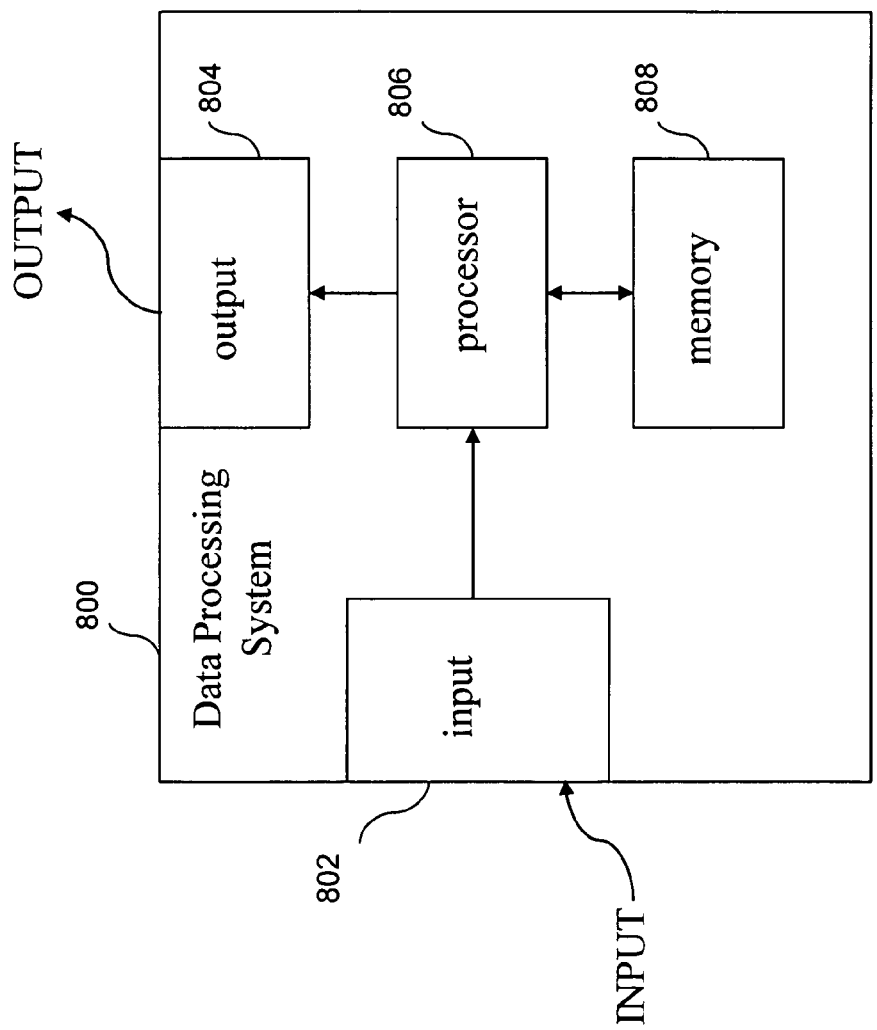
FIG. 8 is an illustration of a data processing system according to the present invention.

FIG. 8 illustrates a block diagram depicting components of a data processing system 800 (e.g., computer) incorporating the operations of the method described above. The method utilizes a data processing system 800 for storing computer executable instruction means for causing a processor (or processors) to carry out the operations of the above described method. The data processing system 800 comprises an input 802 for receiving information from a user. Information received may include input from devices such as cameras, scanners, keypads, keyboards, microphone, other peripherals such as storage devices, other programs, etc. The input 802 may include multiple "ports." An output 804 is connected with a processor 806 for providing information for transmission to other data processing systems, to storage devices, to display devices such as monitors, to generating information necessary for delivery, and to other mechanisms for presentation in user-usable forms. The input 802 and the output 804 are both coupled with the processor 806 (or processors), which may be a general-purpose computer processor or a specialized processor designed specifically for use with the present invention. The processor 806 is coupled with a memory 808 to permit storage of data and software to be manipulated by commands to the processor 806.

Figure 9:
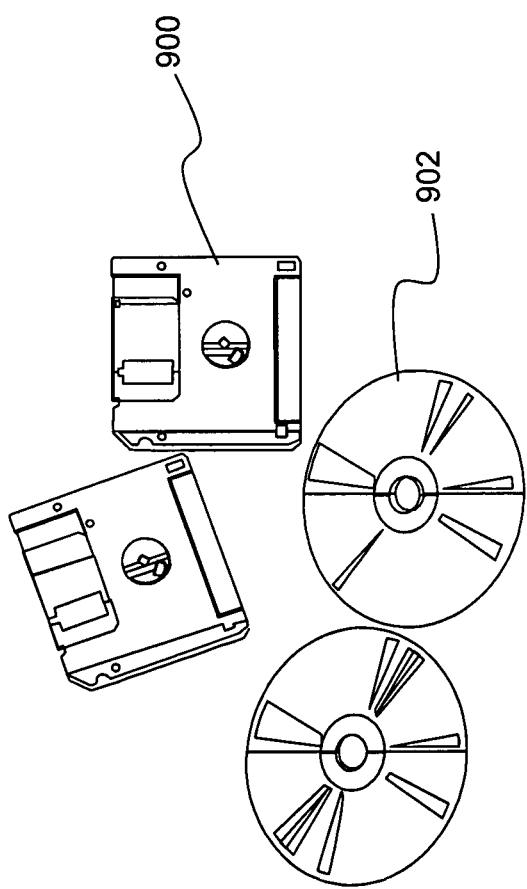
FIG. 9 is an illustration of a computer program product according to the present invention.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents instruction means (i.e., computer readable code) stored on any compatible computer readable medium.

(4) Conclusion

The present invention describes a bio-inspired automatic data clustering system. In this system, the Freeman's KIII network is used as a feature-mapping machine to map input data into a feature space. Additionally, the fuzzy ART is used to estimate the number of clusters inside the data. Finally, fuzzy C-mean is used to cluster the KIII feature data with the estimated number of clusters. The invention described herein can be applied to many applications related to high dimen-

What is claimed is:

1. A system for automatic data clustering, the system comprising:
   one or more processors and a memory having instructions such that when the instructions are executed, the one or more processors perform operations of:
   mapping a set of input data into a feature space using a computing model;
   finding an optimal vigilance parameter that yields an optimal quality of clustering of the input data, wherein the quality of clustering is determined by computing a set of clustering quality measures, wherein the set of clustering quality measures comprises a similarity measure, a separation measure, and a homogeneity measure;
   computing automatically a number of clusters inside the set of input data using fuzzy adaptive resonance theory (ART), wherein the number of clusters is computed based on the optimal vigilance parameter;
   clustering the set of input data based on the computed number of clusters, resulting in a set of clustered data; and
   presenting the set of clustered data.

2. The system for automatic data clustering as set forth in claim 1, wherein the set of input data is mapped with a Freeman's KIII network, wherein each data point in the set of input data is mapped into a KIII network response.

3. The system for automatic data clustering as set forth in claim 2, wherein the set of input data is clustered using a fuzzy c-means method.

4. The system for automatic data clustering as set forth in claim 3, wherein the computed clustering quality measures are used to compute an objective function, wherein the objective function is a function of the vigilance parameter in the fuzzy ART, and wherein the vigilance parameter controls creation of new clusters.

5. The system for automatic data clustering as set forth in claim 4, wherein in the act of computing automatically a number of clusters inside the set of input data, the system further performs operations of searching for the optimal vigilance parameter that maximizes the objective function by varying the vigilance parameter within a given dynamic range, wherein the optimal vigilance parameter is used to compute the number of clusters.

6. A computer-implemented method for automatic data clustering,
   the method comprising an act of causing a processor to perform operations of:
   mapping a set of input data into a feature space using a computing model;
   finding an optimal vigilance parameter that yields an optimal quality of clustering of the input data, wherein the quality of clustering is determined by computing a set of clustering quality measures, wherein the set of clustering quality measures comprises a similarity measure a separation measure, and a homogeneity measure:
   computing automatically a number of clusters inside the set of input data using fuzzy adaptive resonance theory (ART), wherein the number of clusters is computed based on the optimal vigilance parameter;
   clustering the set of input data based on the computed number of clusters, resulting in a set of clustered data; and
   presenting the set of clustered data.

7. The method for automatic data clustering as set forth in claim 6, further comprising an act of mapping the set of input data with a Freeman's KIII network, wherein each data point in the set of input data is mapped into a KIII network response.

8. The method for automatic data clustering as set forth in claim 7, further comprising an act of clustering the set of input data using a fuzzy c-means method.

9. The method for automatic data clustering as set forth in claim 8, wherein the computed clustering quality measures are used to compute an objective function, wherein the objective function is a function of the vigilance parameter in the fuzzy ART, and wherein the vigilance parameter controls creation of new clusters.

10. The method for automatic data clustering as set forth in claim 9, wherein in the act of computing automatically a number of clusters inside the set of input data, the method further comprises an act of searching for the optimal vigilance parameter that maximizes the objective function by varying the vigilance parameter within a given dynamic range, wherein the optimal vigilance parameter is used to compute the number of clusters.

11. A computer program product for automatic data clustering, the computer program product comprising computer-readable instruction means stored on a non-transitory computer-readable medium that are executable by a computer having a processor for causing, the processor to perform operations of:
   mapping a set of input data into a feature space using a computing model;
   finding an optimal vigilance parameter that yields an optimal quality of clustering of the input data, wherein the quality of clustering is determined by computing a set of clustering quality measures, wherein the set of clustering quality measures comprises a similarity measure, a separation measure, and a homogeneity measure:
   computing automatically a number of dusters inside the set of input data using fuzzy adaptive resonance theory (ART), wherein the number of clusters is computed based on the optimal vigilance parameter;
   clustering the set of input data based on the computed number of clusters, resulting in a set of clustered data; and
   presenting the set of clustered data.

12. The computer program product for automatic data clustering as set forth in claim 11, further comprising instruction means for mapping the set of input data with a Freeman's KIII network, wherein each data point in the set of input data is mapped into a KIII network response.

13. The computer program product for automatic data clustering as set forth in claim 12, further comprising instruction means for clustering the set of input data using, a fuzzy c-means method.

14. The computer program product for automatic data clustering as set forth in claim 13, wherein the computed clustering quality measures are used to compute an objective function, wherein the objective function is a function of the vigilance parameter in the fuzzy ART, and wherein the vigilance parameter controls creation of new clusters.

15. The computer program product for automatic data clustering as set forth in claim 14, further comprising instruction means for searching for the optimal vigilance parameter that maximizes the objective function by varying the vigilance parameter within as given dynamic range, wherein the optimal vigilance parameter is used to compute the number of clusters.

* * * * *